(12) United States Patent
Agazzi

(10) Patent No.: US 7,251,297 B2
(45) Date of Patent: Jul. 31, 2007

(54) METHOD AND SYSTEM TO IDENTIFY AND CHARACTERIZE NONLINEARITIES IN OPTICAL COMMUNICATIONS CHANNELS

(75) Inventor: Oscar E. Agazzi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 886 days.

(21) Appl. No.: 09/989,367

(22) Filed: Nov. 20, 2001

(65) Prior Publication Data

US 2002/0060827 A1 May 23, 2002

Related U.S. Application Data

(60) Provisional application No. 60/253,207, filed on Nov. 27, 2000, provisional application No. 60/252,711, filed on Nov. 22, 2000.

(51) Int. Cl.
*H03D 1/00* (2006.01)
(52) U.S. Cl. ............ 375/340; 375/229; 375/230; 375/231; 375/232; 375/233; 375/348
(58) Field of Classification Search ............ 375/340, 375/229, 230, 231, 232, 233, 348
See application file for complete search history.

(56) References Cited

U.S. PATENT DOCUMENTS 4,747,094 A * 5/1988 Sakaguchi et al. .......... 398/101
5,726,965 A 3/1998 Hajjar et al.
6,600,794 B1 * 7/2003 Agarossi et al. ............ 375/341

OTHER PUBLICATIONS

Sands, "Non-linear identification on the digital magnetic recording channel", Nov. 4-6, 1991, Twenty-Fifth Asilomar Conference on Signals, Systems and Computers. pp. 6-10 vol. 1.*
Bellini,"Nonlinear cross talk cancellation for high density optical recording", 1999, Global Telecommunications Conference, 1999. GLOBECOM '99 vol. 1B,pp. 933-938 vol. 1b.*
Agarossi, "An effective Non Linear Receiver for high density optical disk", IEEE Global Telecommunications Conference, 1998. GLOBECOM 98. The Bridge to Global Integration. IEEE vol. 6, Nov. 8-12, 1998 pp. 3374-3378 vol. 6.*

(Continued)

*Primary Examiner*—Temesghen Ghebretinsae
*Assistant Examiner*—Juan Alberto Torres
(74) *Attorney, Agent, or Firm*—Sterne, Kessler, Goldstein & Fox P.L.L.C.

(57) ABSTRACT

A method for identifying and modeling nonlinearities in communications channels, particularly optical communication channels. A channel in general is modeled as a summation of linear and non linear terms having memory. The terms are functions of the input to the channel with respect to time, such as a sequence of input bits to the channel. In one embodiment the most recent input bits are used to access a value in a look up table. The value accessed is compared to an actual value received from the channel. The difference between the value in the table and the actual channel value may be used to correct the value in the table. When the look up table and the channel converge the look up table contains a model of the channel with memory that can model nonlinearities. A nonlinear channel having memory may also be modeled in terms of Volterra Kernels.

47 Claims, 15 Drawing Sheets

OTHER PUBLICATIONS

Winters, Jack H. et al., Reducing the Effects of Transmission Impairments in Digital Fiber Optic Systems, IEEE Communications Magazine, Jun. 1993, pp. 68-76.

Kasturia, Sanjay et al., Techniques for High-Speed Implementation of Nonlinear Cancellation, IEEE Journal on Selected Areas in Communications, Jun. 1991, pp. 711-717, vol. 9, No. 5.

Sauer-Greff, W., et al., Maximum-Likelihood Sequence Estimation of Nonlinear Channels in High-Speed Optical Fiber Systems, Slide Presentation Material, Apr. 6, 2001, 29 pages.

Kasper, B.L., Equalization of Multimode Optical Fiber Systems, The Bell System Technical Journal, Sep. 1982, pp. 1367-1388, vol. 61, No. 7, American Telephone and Telegraph Company.

Winters, Jack H. et al., Electrical Signal Processing Techniques in Long-Haul Fiber-Optic Systems, IEEE Transactions on Communications, Sep. 1990, pp. 1439-1453, vol. 38, No. 9.

Humblet, Pierre A., et al., On the Bit Error Rate of Lightwave Systems with Optical Amplifiers, IEEE Journal of Lightwave Technology, Nov. 1991, pp. 1576-1582, vol. 9, No. 11.

Black, William C., Jr., et al., Time Interleaved Converter Arrays, IEEE Journal of Solid-State Circuits, Dec. 1980, pp. 1022-1029, vol. SC-15, No. 6.

Ellersick, William, et al., GAD: A 12-GS/s CMOS 4-bit A/D Converter for an Equalized Multi-Level Link, 1999 Symposium on VLSI Circuits Digest of Technical Papers, pp. 49-52.

Ellersick, William, et al., A Serial-Link Transceiver Based on 8GSample/s A/D and D/A Converters in 0.25 μm CMOS, IEEE International Solid State Circuits Conference, 2001/Session 4/High Speed Digital Interfaces/4.1, 3 pgs.

Yang, Chih-Kong Ken, et al., A Serial-Link Transceiver Based on 8-GSamples/s A/D and D/A Converters in 0.25-μm CMOS, IEEE Journal of Solid-State Circuits, Nov. 2001, pp. 1684-1692, vol. 36, No. 11.

Dally; William J., et al., Transmitter Equalization for 4Gb/s Signalling, Proceedings of Hot Interconnects IV, Palo Alto, 1996, 10 pgs.

Jenq, Yih-Chyun, Digital Spectra of Nonuniformly Sampled Signals: A Robust Sampling Time Offset Estimation Algorithm for Ultra High-Speed Waveform Digitizers Using Interleaving, IEEE Transactions on Instrumentation and Measurement, Feb. 1990, pp. 71-75 vol. 39, No. 1.

Eklund, Jan-Erik, et al., Digital Offset Compensation of Time-Interleaved ADC Using Random Chopper Sampling, IEEE International Symposium on Circuits and Systems, May 2000, pp. 447-450, Geneva, Switzerland.

Fu, Daihong, et al., A Digital Background Calibration Technique for Time-Interleaved Analog-to-Digital Converters, IEEE Journal of Solid-State Circuits, Dec. 1998, pp. 1904-1911, vol. 33, No. 12.

Izzard, M.J., et al., Analog versus Digital Control o a Clock Synchronizer for 3 Gb/s Data with 3.0V Differential ECL, 1994 Symposium on VLSI Circuits Digest of Technical Papers, pp. 39-40.

Jin, Huawen, et al., A Digital-Background Calibration Technique for Minimizing Timing-Error Effects in Time-Interleaved ADC's, IEEE Transactions on Circuits and Systems—II: Analog and Digital Signal Processing, Jul. 2000, pp. 603-613, vol. 47, No. 7.

Conroy, Cormac S.G., et al., An 8-b 85-MS/s Parallel Pipeline A/D Converter in 1- μm CMOS, IEEE Journal of Solid-State Circuits, Apr. 1993, pp. 447-454, vol. 28, No. 4.

T. Thormundsson et al., *Cancellation of Nonlinear Intersymbol Interference in Voiceband Communication Channels*, Mar. 1997, pp. 862-865, 0-7803-3905, Engineering Research Institute, University of Iceland.

S. Bellini et al., *Nonlinear Cross Talk Cancellation for High Density Optical Recording*, Global Telecommunications Conference—Globecom '99, May 1999, pp. 933-938, O-7803-5796, Politecnico de Milano, Italy.

N. Sands et al., *Non-Linear Identification on the Digital Magnetic Recording Channel*, Information Systems Laboratory, Mar. 1991, pp. 6-10, 1058-6393/91, Stanford University, Stanford, CA.

International Search Report, dated Jul. 1, 2002.

\* cited by examiner

| FIBER | CORE DIAMETER [μm] | LENGTH [m] | MANUFACTURER |
|---|---|---|---|
| F0 | 62.5 | 270 | FUJIKURA |
| F1 | 50.0 | 1152 | CORNING |
| F2 | 62.5 | 2234 | CORNING |
| F3 | 50.0 | 2247 | CORNING |
| F4 | 62.5 | 1151 | CORNING |
| F5 | 50.0 | 540 | CORNING |

| FIBER | SNR [dB] (LINEAR MODEL) | SNR [dB] (NONLINEAR MODEL) |
|---|---|---|
| F0 | 12.8 | 23.2 |
| F1 | 12.1 | 24.7 |
| F2 | 13.4 | 24.9 |
| F3 | 13.3 | 23.7 |
| F4 | 12.4 | 23.8 |
| F5 | 12.5 | 23.7 |

NOTE: SNR IS DEFINED AS $10 \log_{10}$(SIGNAL POWER/ERROR POWER), AND IT DOES NOT NECESSARILY COINCIDE WITH THE SLICER SNR OF A RECEIVER

FIG. 9

| FIBER | SNR [dB] (LINEAR MODEL) |
|---|---|
| F0 | 28.2 |
| F1 | 26.6 |
| F2 | 26.7 |
| F3 | 27.4 |
| F4 | 28.7 |
| F5 | 28.2 |

NOTE: SNR IS DEFINED AS $10 \log_{10}$(SIGNAL POWER/ERROR POWER), AND IT DOES NOT NECESSARILY COINCIDE WITH THE SLICER SNR OF A RECEIVER

FIG. 12

METHOD AND SYSTEM TO IDENTIFY AND CHARACTERIZE NONLINEARITIES IN OPTICAL COMMUNICATIONS CHANNELS

CROSS-REFERENCE TO RELATED APPLICATION(S)

This application claims priority from provisional applications "METHOD TO IDENTIFY AND CHARACTERIZE NONLINEARITIES IN OPTICAL COMMUNICATIONS CHANNELS" Ser. No. 60/253,207 filed on Nov. 27, 2000, and from "METHOD AND SYSTEM FOR OPTICAL CHANNEL IDENTIFICATION AND MODELING" Ser. No. 60/252,711 filed on Nov. 22, 2000. Both provisional applications 60/253,207 and 60/252,711 are incorporated herein by reference as though set forth in full.

FIELD OF THE INVENTION

The invention relates to methods used to characterize communication channels and, in particular embodiments, to methods used to characterize and model nonlinear optical communication channels.

BACKGROUND OF THE INVENTION

Signal distortion in an optical channel may be caused by nonlinearities that exist in various components, which comprise an optical channel. Such distortion can be characterized by mathematical models of the nonlinear behavior of the optical communication channel. By using such models, compensatory measures, for example equalizers that compensate for distortion, which degrades the performance of the channel, may be designed.

One source of distortion is dispersion. Dispersion may be a combination of linear and nonlinear components.

Dispersion found in optical fibers, particularly multimode fibers, may limit the bandwidth in optical channels. The problem of dispersion may be more acute in multimode fibers in general, but it may also be a problem in single mode fibers, especially in long runs of fiber. Single mode fibers commonly have lower dispersion than multimode fiber. The dispersion commonly found in single mode fibers may be chromatic dispersion or polarization mode dispersion. The dispersion that is seen in single mode fibers is generally a lot less per length than the dispersion found in multimode fibers. Dispersion is cumulative, however, and so tends to increase as fibers increase in length. Accordingly, methods discussed herein in terms of multimode fibers may apply equally well to single mode fibers.

In multi-mode fibers, the multiple modes of propagation within the fiber commonly cause dispersion. Generally, in the various modes of propagation within a fiber, the light signal has different speeds of propagation. So if a light pulse is sent from a transmitter, the pulse will propagate in multiple modes traveling at different speeds. The pulse, traveling in each mode, will reach the receiver at a different time. The multiple times of arrival of the input pulse traveling in several modes create a distorted pulse, somewhat like a spread out version of the transmitted pulse.

Optical channels are inherently nonlinear. Electromagnetic fields can be described by Maxwell's equations, which are linear. Because Maxwell's equations are linear, the principle of superposition applies to the electromagnetic field. What is modulated, however, in optical channels is not the electromagnetic field per se, it is the optical power. Superposition doesn't exactly apply to optical power.

An optical photo detector is commonly a square law device. The photodetector responds linearly to the optical power, in fact the photo current generated by a photodetector is commonly a very accurately linear function of the optical power, but the power is a quadratic function of the electromagnetic field, thus creating a source of nonlinearity.

It has been shown that if a laser has a large spectral width, instead of being a very monochromatic laser, the significant spectral width tends to result in a linearization of the channel even considering the effect of the optical power and the square law nature of the photodetector. In other words if a laser has a very monochromatic, narrow spectrum then the channel tends to behave less linearly than does a laser that has a wider spectrum.

Nonlinear behavior in an optical channel may depend to varying extent on the properties of the photodetector and the fiber. Additionally there is a possibility of distortion from the laser itself. If there is dispersion in the laser, for example because the laser has some bandwidth limitation itself, then nonlinearity of the laser could also contribute to the total nonlinearity in the optical channel.

When the intensity of an optical signal is high, a fiber optic which transmits the optical signal itself may introduce nonlinearities. These nonlinearities may result from the fact that the index of refraction of the fiber optic depends, to some extent, on the intensity of the optical signal itself. This effect commonly gives rise to nonlinearities known as "four-wave mixing", "self-phase modulation", and "cross-phase modulation". Additional nonlinearities may result from the phenomena known as stimulated Raman scattering and stimulated Brillouin scattering. For a more comprehensive treatment of nonlinearities, see the text "Fiber-Optic Communication Systems", second edition, by Govind P. Agrawal, John Wiley and Sons, 1997, ISBN 0-471-17540-4, which is incorporated by reference herein.

Although the above sources of nonlinearity in an optical channel are presented as examples, other sources may exist. The techniques described in this disclosure may be applied to all kinds of nonlinearities regardless of their physical source, as will be clear to those skilled in the art.

SUMMARY OF EMBODIMENTS OF THE INVENTION

In one aspect of the invention, the disclosure illustrates a method for modeling the behavior of a data channel. To create the model, the sequence of data input to the data channel is examined. A portion of the sequence of data input to the data channel is used as an index to a channel model value. Output data from the channel is sampled. A numerical channel model value is compared with the sampled value and the channel model value is adjusted based on the results of the comparison. The difference between the model value (e.g., stored in a table) and the actual channel value may be used to correct the model value in the table using a LMS (Least Means Squared) algorithm.

In another aspect of the invention, a method for modeling the behavior of a data channel using Volterra Kernels is illustrated. A sequence of data is provided to the data channel. A part of the sequence of data input to the channel is provided to the Volterra Kernel model of the channel. The Volterra Kernel (VK) model produces a channel model value. The data values measured from the channel are compared to the VK channel model value and the results used to update the Volterra Kernel model.

A nonlinear channel having memory modeled in terms of Volterra Kernels may equivalently change into a look up table model using the Hadamard transform. The Volterra Kernel representation also has the added advantage that it can represent a look up table of N table entries in at most N−1 Volterra kernels. In many cases only a few Volterra Kernels are required to model the behavior of the channel. For example embodiments are disclosed in which two Kernels may model a nonlinear fiber optic channel, operating at a wavelength of 850 nanometer through a multimode channel at a data rate of 1 Gigabit per second.

BRIEF DESCRIPTION OF THE DRAWINGS

The features, aspects, and advantages of the present invention, which have been described in the above summary, will be better understood with regard to the following description, appended claims, and accompanying drawings where:

FIG. 9 is a table of the signal to noise ratios computed for linear and nonlinear channel models for a channel operated at a wavelength of 850 nanometers.

FIG. 12 is a table of signal-to-noise ratios for a linear model of a channel employing 1310 nanometer DFB laser.

DETAILED DESCRIPTION OF EMBODIMENTS OF THE INVENTION

The listed figures describe and illustrate various aspects of the present invention.

Figure 1:
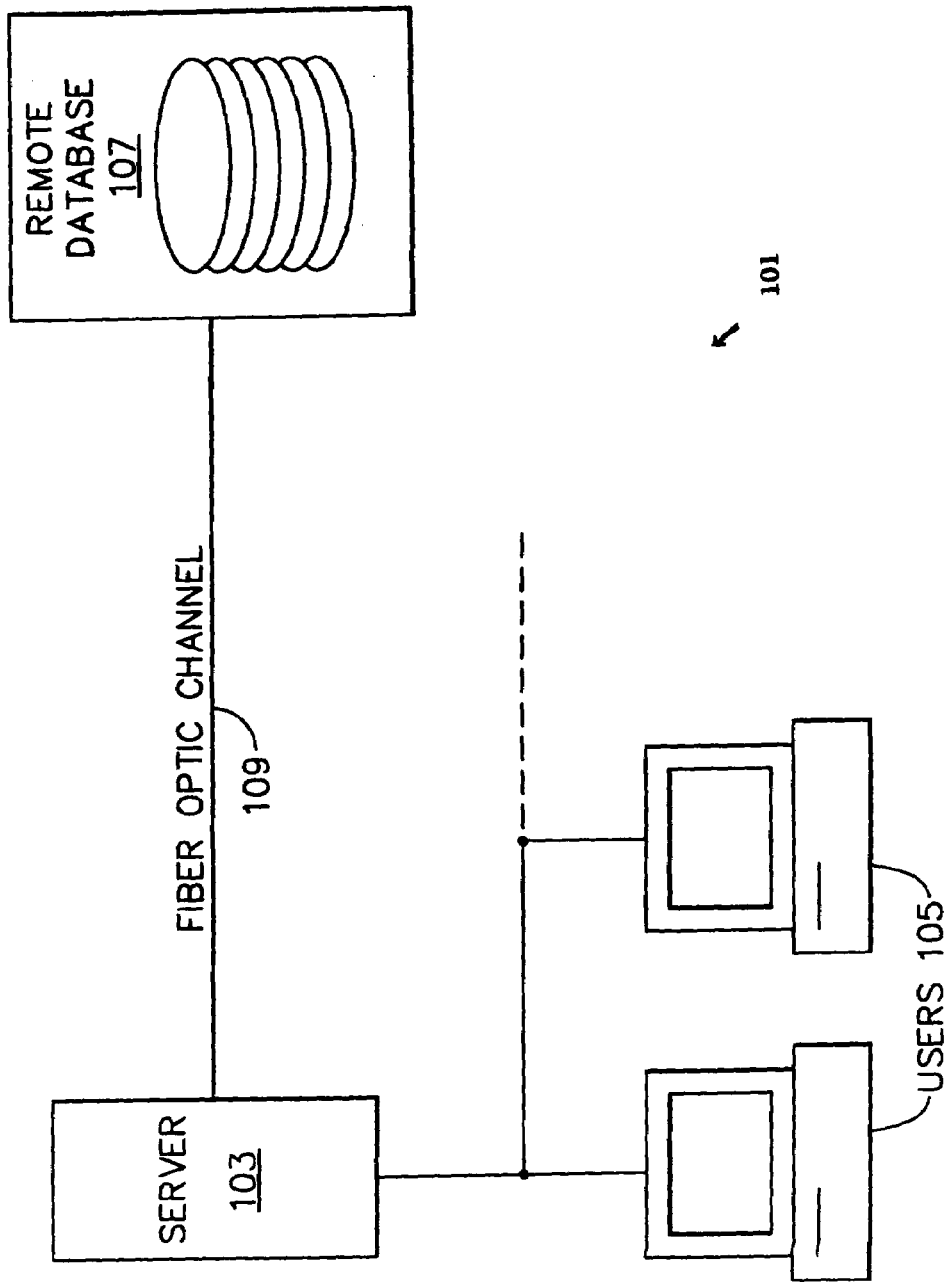
FIG. 1 is a graphical illustration of an environment in which embodiments of the present invention may be used.

Accordingly, FIG. 1 is a graphic illustration of an environment in which embodiments of the present invention may be used. The environment illustrated at 101 is an information distribution system, such as may be found, for example, in a computer network accessing a remote database.

In FIG. 1, users 105 are coupled to a server 103. The users then may communicate with remote database 107 using fiber optic 109. Fiber optics may be used to communicate large amounts of data between points because of their large bandwidth.

The data rate of optical channels is, in part, limited by nonlinearities in the channel. The term "channel", as used herein, includes the laser, amplifiers that drive the laser, the fiber optic, the photo detector receiver and all elements included in the transmission and reception of a fiber optic signal.

Figure 2:
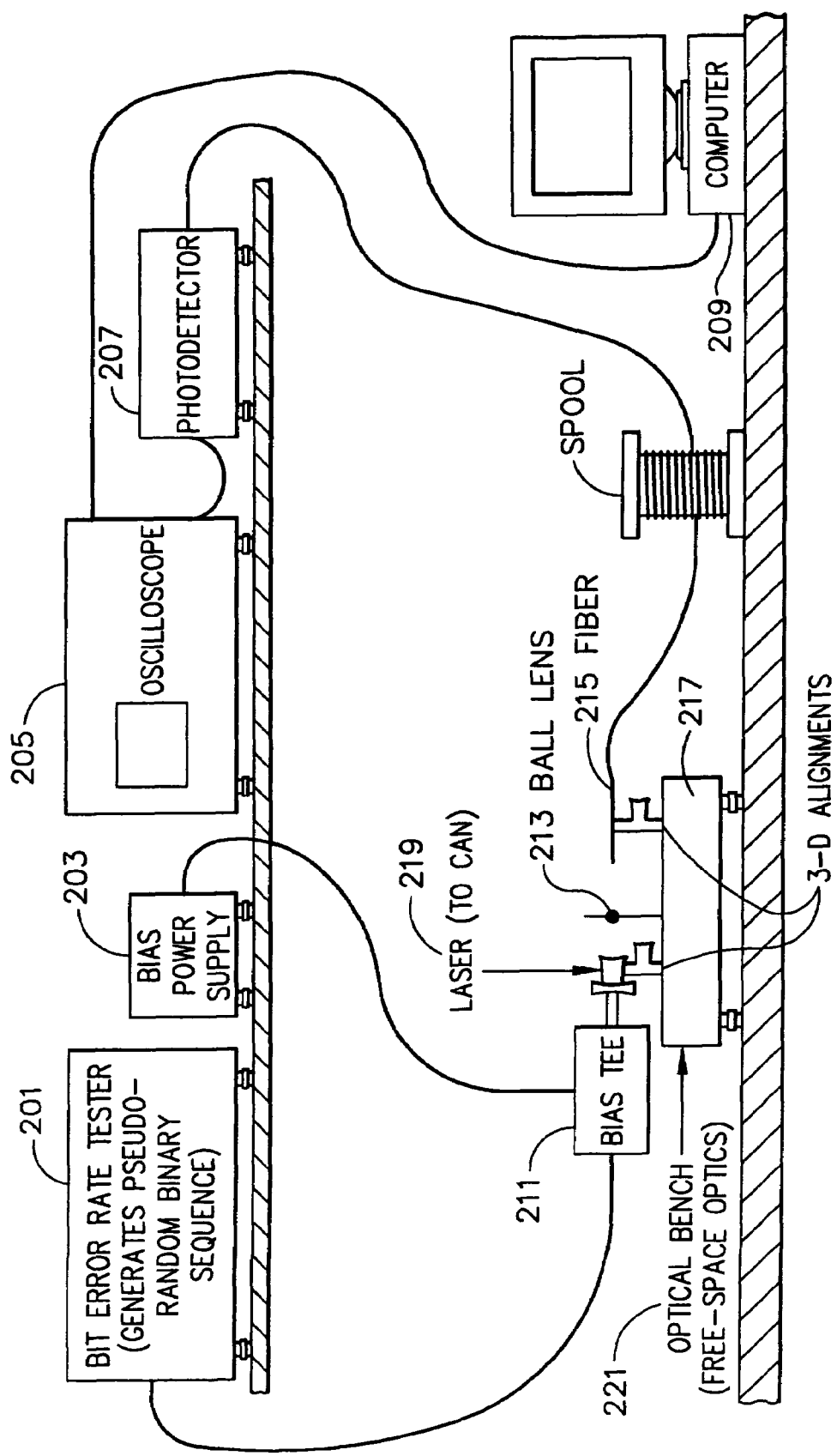
FIG. 2 is a graphical illustration of an equipment setup, which may be used to characterize optical channels.

For characterizing optical channels, the measurement setup illustrated in FIG. 2 was used.

FIG. 2 is a graphical illustration of an equipment setup used to characterize optical channels. A signal is generated by modulating a laser 219. The modulated 10 laser signal is provided to a fiber optic 215. In the embodiment illustrated in FIG. 2, the signal provided to the optical channel was a 1 Gigahertz (GHz), 127 bit, pseudo-random binary sequence provided by bit error rate tester 201. The resulting received signal was detected by a photodetector 207, captured using an oscilloscope 205 and stored as a file in computer 209. Using computer 209, the received signal may be processed and the nonlinearity that exists in the received signal can be identified. The approach taken is that no attempt is made to identify the source of the nonlinearity as belonging to a specific channel component such as a photodetector or laser or any other source. Instead the nonlinearity in the received signal was examined without being concerned for the physical source of the nonlinearity.

Two types of lasers were tested. The first type was a 850 nanometer VCSEL (vertical cavity surface emitting laser) and the second type of laser was a 1310 nanometer DFB (distributed feedback) laser. All measurements were done at a data rate of 1 gigabit per second.

The bit error rate data tester 201 generated a pseudo random binary sequence that was periodically repeated. The channel measurements were performed at a data rate of 1 gigabit per second, but the method may be applied to any data rate.

In the setup illustrated in FIG. 2 free space optics and an optical bench 221 were used. The laser was aligned using alignment screws so that the laser 219, the fiber 215 and the lens were arranged to focus the light into fiber 215. Laser 219 requires a DC bias current provided by bias power supply 203. A bias Tee 211 allows the combination of the data signal with a bias in order to apply a correctly biased data signal to the laser 219.

A length of fiber 215 is contained in a spool so that lengthy fibers up to more than 1 kilometer may be used. In the case of single-mode fibers, the length of the spool could exceed 700 km. Photodetector 209 is a commercial unit having a bandwidth of 10 gigahertz. The oscilloscope 205 is a real time sampling oscilloscope which samples at 8 gigahertz. Because the data rate used was 1 gigabit per second, the received signal was sampled on average 8 times per bit. Samples of the received signal were captured in the memory of the oscilloscope and then downloaded to the computer 209 in the form of a file. Typical received signal data files contained about 65,000 data points representing received samples of the pseudo random input sequences of 127 bits.

Once the data points have been accumulated they may be processed and information about the behavior of the optical channel, particularly the nonlinearity, may be extracted. Additionally any possible nonstationarity of the channel may be identified. In other words, if the channel changes in time, such nonstationarity may be detected. In the measurements taken, however, no significant nonstationarity was observed.

Figures 3, 4:
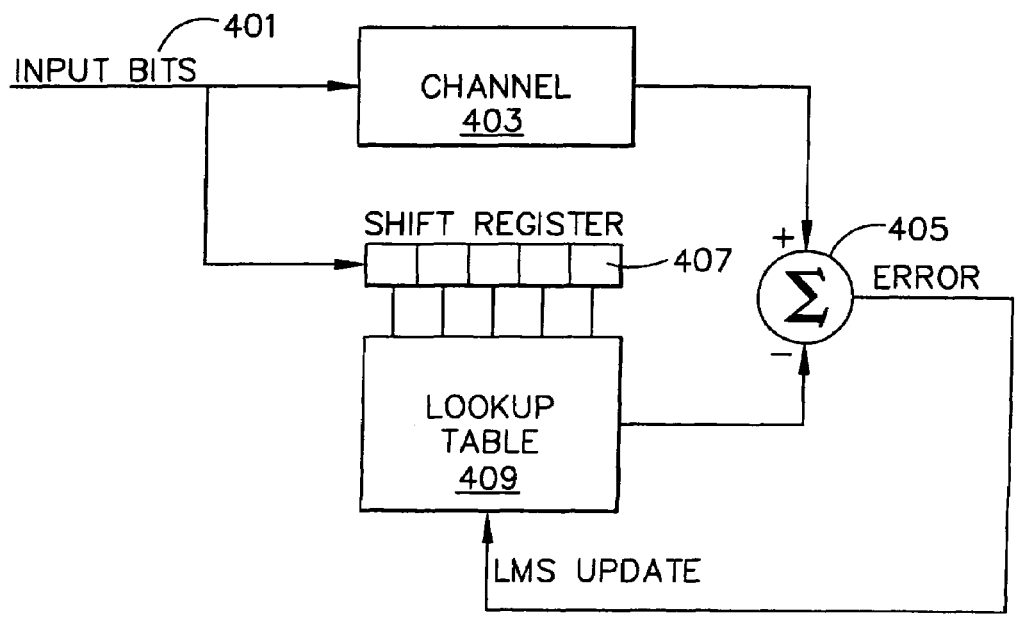
FIG. 3 is a table listing of fibers, which were measured using the measurement setup illustrated in FIG. 2.
FIG. 4 is a graphic illustration of an example of a system that may be used for channel identification.

FIG. 3 is a table listing of fibers, which were measured using the measurement setup illustrated in FIG. 2. Six different fibers, having core diameters from 50 to 62½ microns and the lengths from 270 meters to about 2.2 kilometers, were tested. All of the fibers exhibit some dispersion phenomenon and bandwidth limitation to varying extent.

To model channel nonlinearity two different mathematical methods, representing nonlinear functions having memory, were chosen. Because dispersion is inherently a function having memory, the resulting channel nonlinearity is a nonlinear function with memory, as opposed to memoryless nonlinearity. Memoryless nonlinearity may be represented by a function of the form Y=F(X), with the nonlinearity an arbitrary nonlinear function F of a single variable. Nonlinearity with memory can be described as a nonlinear function of a number of consecutive samples of the transmitted data, so that the nonlinear function with memory is of the form $Y=F(X_n,X_{n-1},X_{n-2}, \ldots )$. In other words nonlinearity with memory is a function of several variables, where the variables are exemplarily samples of the transmitted bit sequence. Nonlinearity with memory is a more general kind of nonlinearity that may be found in optical channels. In other words the characteristic of an optical channel is not only a function of the current bit, but depends also on previously transmitted bits.

The nonlinearity in an optical channel can be modeled as a look-up table, for example as a nonlinear function of the five most recently transmitted bits. In a digital transmission system the transmitted bits have 2 levels, 0 and 1 (or +1 and −1 depending on the convention that is used). Because of the discrete nature of the transmitted bits, the function characterizing a channel depending on the five most recent bits can only have $2^5=32$ values. Accordingly there are 32 possible values that model the channel by listing all the values for all the possible sequences of the most recent 5 input bits. Such a model can be implemented as a look-up table. The look up table is one model with memory for characterizing an optical channel having nonlinearity.

A second optical channel model is based on a Volterra series. Volterra series have been studied in mathematics for a considerable time. Volterra series are a way to represent nonlinear functions. In general Volterra series are infinite series, i.e. a series with infinite number of terms. In the present case, however, since the transmitted data is binary, the number of terms is finite. The number of terms in the series used to model a binary optical channel is 2 to the power N, where N is the number of most recent transmitted bits, which are taken into account. That is the same number of terms as the number of entries in a look-up table. Accordingly, no matter what description is used, whether the look-up table approach or the Volterra series approach, the number of required elements in each model is 2 to the power N, where N is the number of most recent bits transmitted that are taken into account. In the look-up table approach the 2 to the N parameters are the values of the channel for all the possible values of the most recent N input bits.

For the Volterra series, the parameters are the coefficients of the series and because the series has $2^N$ terms there are $2^N$ coefficients. $2^N$ is the same number of parameters as required by the look up table model. Accordingly regardless of which description is chosen, the maximum number of parameters that is needed to completely specify the nonlinear function is the same, i.e. $2^N$. It can be shown that the Volterra Kernel representation is mathematically equivalent to the look-up table. In fact a mathematical transformation known as the Hadamard transformation can transform the look up table model to the Volterra Kernel model and Volterra Kernel model to the look up table model.

N is generally an empirically determined value, the exemplary value of N=5 in the present embodiment appears to work very well. The value of N, of course could depend on the fibers, wavelength of the laser and the rate of the data being transmitted. In principle it is possible to find fibers where N is larger or smaller, but in present embodiments N=5 is sufficient.

An advantage of choosing the Volterra series description is that there is a way to make the description somewhat compact by grouping terms. By grouping the terms $2^N$ terms are transformed into $2^{(N-1)}$ convolution-like terms having a shift register-type sequence. That means, for example, the terms that go into the sequence of grouped terms are products of bits. So, for example, a $X_N$ term would be multiplied by an $X_{N-1}$ term and so on. The shift register sequence of grouped terms means shifted versions of the product. So, for example, this shift register sequence would be in the form $X_N*X_{N-1}, X_{N-1}*X_{N-2}, X_{N-2}*X_{N-3}$ and so on. This is shift register-type sequence is one that can describe terms of the Volterra series as a convolution of this kind of shift register-type sequence with a certain kernel. A kernel is an element that resembles an impulse response. A kernel is not an impulse response in the traditional sense, but a traditional impulse response is used as a linear portion of the nonlinear kernel function.

Terms involving a convolution of a shift register type sequence with a certain kernel, are referred to as Volterra Kernels. There are multiple Volterra Kernels corresponding to different kinds of products of bits. The maximum number of Volterra Kernels needed to represent an N bit sequence to is $2^{N-1}$. So, for example, in the case where N=5, the total number of terms in the Volterra series is $2^N$ or 32 terms. But these 32 terms can be mapped into 16 Volterra Kernels. Sixteen Volterra Kernels suffice and the number of Volterra Kernels is equal to $2^{(N-1)}$, or in the present example $2^4$ or 16. So there are 16 Volterra Kernels and the Volterra Kernels may provide a more convenient and more compact description of a nonlinearity particularly because commonly in many applications the number of Volterra Kernels is actually less than $2^{(N-1)}$. Although the number of Volterra Kernels to theoretically define a Volterra Kernel model is $2^{(N-1)}$, some of the kernels are very small and can be neglected. In some situations the channel may be effectively modeled by one or two Volterra Kernels. That is the situation in the optical channels of the present embodiment. In present embodiments the nonlinearity is simple enough so that it can be described completely by a linear term and a single Volterra Kernel, indicating that a fairly simple kind of nonlinearity is present.

Because the nonlinearity is simple doesn't mean that its negligible. In fact in present embodiments the nonlinearity, though simple, is a very strong. Because the nonlinearity has a simple description, simple equalizers may be built. In other words nonlinear equalizers with memory which are relatively simple but very powerful may be built. Such equalizers can be very effective because they can deal with the nonlinearity that is strong whereas a traditional kind of linear equalizer might fail completely.

FIG. 4 is a graphic illustration of an example of a system that may be used for channel identification. The system is implemented in software.

Input bits 401 are provided to a channel 403. What is used for the channel 403 is the measurements that were taken with the setup illustrated in FIG. 2. So the channel input and channel response are actual measured values.

In the present embodiment the measurements are stored in a file and then processed off-line in a computer using a software program that implements the remainder of the system illustrated in FIG. 4. This was done for the sake of convenience because the equipment for the setup in FIG. 2 was readily available. There is however no constraint to prevent the present disclosed methods from being implemented as part of a real time or embedded system.

The look-up table 409 is adaptive. That is the value in it can be adapted using the LMS (least-means-squared) algorithm. Basically what is done is to compare the measured sequence from the channel 403 (the file of received values stored by computer 209) with the output of the look-up table. The addresses in the look up table 409 are received from a shift register 407 representing the values of the latest 5 input bits provided as input to the channel. Initially the look-up table values are initialized to all zeros started from situations where there is no knowledge of the nonlinearity. In such a case the error will be equal to the input signal. So the error will be large initially. The values in the look up table can be adjusted using an LMS algorithm to update the look-up table according to the error 405 observed. The LMS algorithm will converge so that it tends to drive the error to zero or as close as possible to zero.

Once the look-up table converges the error will be small or zero. In actual practice the error may not be exactly zero because the input signal may include some random noise. Additionally it is also possible the look-up table doesn't perfectly model all the nonlinearity. There may be some residual unaccounted for nonlinearity because N was chosen equal to 5 but in practice a N of 8 or 10 may have been required to more closely model the fiber. The choice of N is an implementation detail depending on the type of fiber, data rate, and a variety of other factors.

Additionally in FIG. 4 the look up table is like having an array where the address is created by looking at 5 consecutive bits, but the number is accessed is a single number that could be represented by multiple bits which could be 16 bits or 24 bits, and as such may contain some quantization error.

Figure 5:
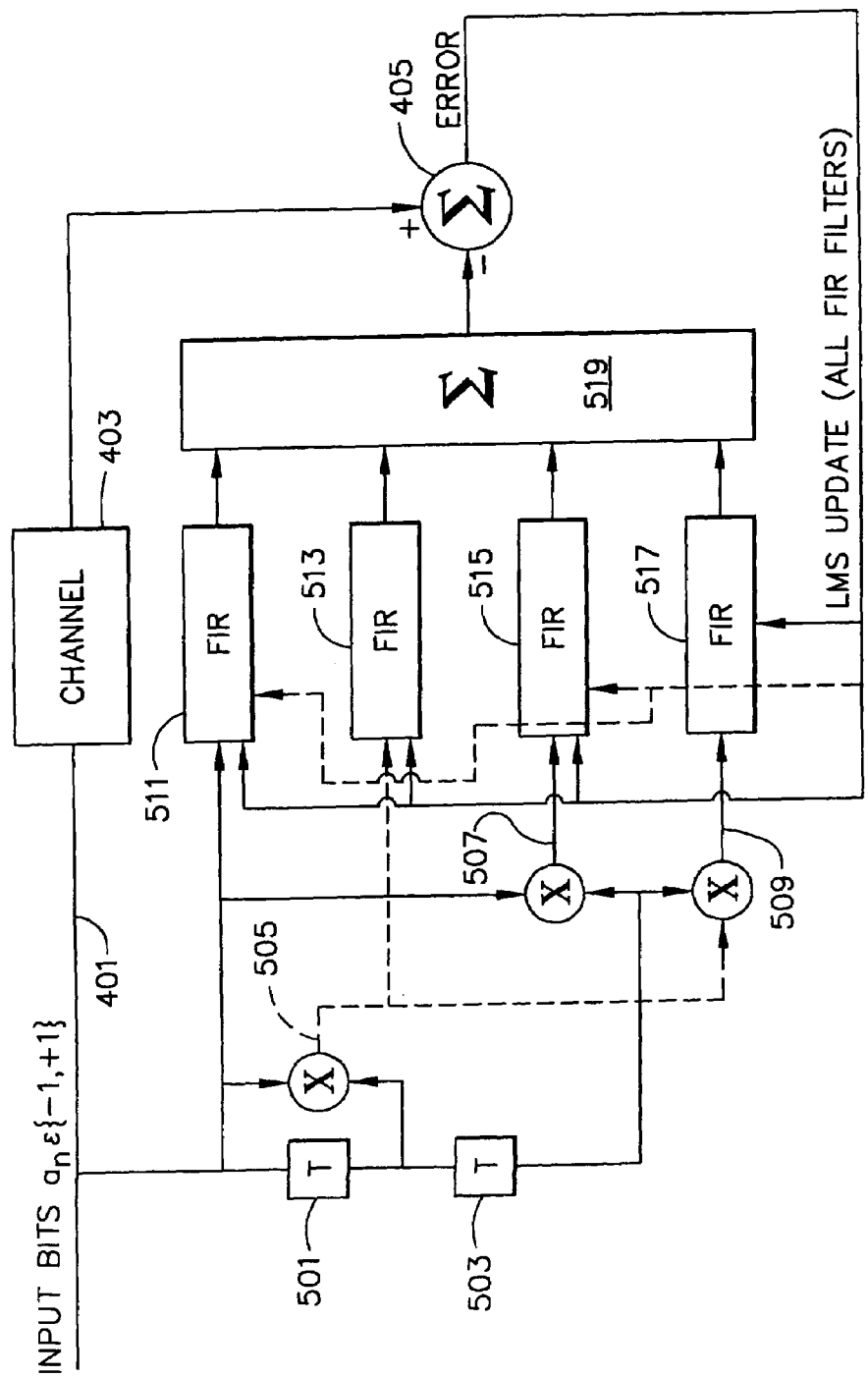
FIG. 5 is a graphical illustration of channel identification based on Volterra Kernels (VK).

FIG. 5 is a graphical example of channel identification based on Volterra Kernels. The Volterra Kernel approach is an approach mathematically equivalent to the use of a look-up table, as illustrated in FIG. 4. In FIG. 5, four Volterra Kernels are used. Normally there would be 16 Volterra Kernels present in a case where N is equal to 5. In some cases some of the Volterra Kernels may be negligible and depending on the Bit Error Rate (BER) required only the most important ones may need to be taken into account in the model, as for instance illustrated in FIG. 5. For example in FIG. 5 there is a linear term which is represented by the Kernel labeled FIR 511. "FIR" indicates that each Kernel is represented by a finite impulse response (FIR) filter. In FIG. 5, FIR 511 directly takes a sequence of input bits and creates a convolution of 5 the input sequence with an impulse response of FIR filter 511. Hence FIR 511 is a linear term, i.e. a traditional convolution. So if only a term represented by FIR 511 is needed for the channel model, the channel is essentially linear. If, in addition to FIR 511, other terms are present then the model is nonlinear.

FIR 513 is a Volterra Kernel which is associated with products of two consecutive bits, i.e. a second order Volterra Kernel. FIR 513 is a second order Volterra Kernel because it accepts a term 505 which is a product of the most recent input bit and the bit preceding the most recent input bit. The most recent input bit is designated as $A_N$ and the bit preceding the most recent bit is designated $A_{N-1}$.

Second order Volterra Kernel FIR 513 is associated with two (consecutive) bits i.e. bits that are one time delay apart, it accepts the product of two (consecutive) bits. Another second order Volterra Kernel 515 is produced by taking the product of bits that are two time delays apart, 501 and 503 representing time delays. The most recent bit and the bit prior to the second most recent bit are multiplied and result in output 507, which is the accepted by FIR 515. In other words $A_N$ is multiplied by $A_{N-2}$, here, because this is delayed by 2 units. FIR 515 is a Finite Impulse Response filter Oust as FIR 511 and FIR 513) but the input, instead of being bits is the product of 2 bits, and so it is a second order Volterra Kernel. FIR 515 accepts the product of bits $A_N$ and $A_{N-2}$, so it is a different type of Volterra Kernel than FIR 513 that accepts sequential bits. Both FIR 515 and FIR 513 are second order.

A third order Volterra Kernel FIR 517 is determined by the product (509) of 3 bits. 509 is a product of 3 consecutive bits $A_N$, $A_{N-1}$ and $A_{N-2}$. Accordingly FIR 517 is a third order Volterra Kernel.

In the simplified model illustrated in FIG. 5 only the aforementioned 4 kernels, the linear kernel, two second orders kernels, and a third order kernel are present. In practice, if a nonlinearity were very strong, the Volterra Kernel model could have 16 kernels or more if N greater than 5 (where N is the number of most recently transmitted bits to be considered). In the present embodiment out of the 16 Volterra Kernels only the four illustrated in FIG. 5 are significant, the others are negligible.

In the present embodiment FIR 511 and FIR 513 are much more significant than FIR 515 and FIR 517, and in fact FIR 515 and FIR 517 could be completely neglected.

The Volterra Kernel model tends to simplify the description of the channel because it reduces the number of independent terms that need to be taken into account. Volterra Kernels may group together all the terms that are time-shifted versions of each other. In the more general Volterra Series description, all the terms are represented independently. When groups of terms of a Volterra Series are time-shifted versions of each other, they may be associated with each other, and all the ones that are time-shifted versions of each other may be grouped as a single Volterra Kernel.

The two equivalent representations—the look-up table model and the Volterra Kernel model are mathematically equivalent because the Hadamard transformation can transform one into the other. The reason to choose one or the other is essentially ease of implementation. The model that is simpler is commonly dependent on the particular problem that is trying to be solved. For example, if a strongly nonlinear function with short memory is present (meaning small amounts of dispersion) the look-up table probably provides a simpler model. The look up table is likely simpler because, if the dispersion is not large N will not be large. If N is not large then $2^N$ is not a very large number of coefficients. But if the memory span of the nonlinearity (i.e. N) grows then the look-up table grows exponentially because the size of the look-up table is $2^N$. The size of the look up table may become prohibitively complex for large N. In some cases Volterra Kernels may provide a simpler model when N is large and the nonlinearity has a simple form which can be described with few kernels, such as the previous example that could be limited to two kernels.

If N is large, it will generally indicate that there is a lot of dispersion in the channel, but the form of the nonlinear function could be very simple. The function may be simple enough that it can be described, as in the previous example, by only two Volterra Kernels. If N is large and the Volterra model is simpler, the nonlinearity may be completely modeled with two kernels, even though N is very large. Accordingly in some cases the Volterra Kernel description is simpler. In other cases the look-up table description is simpler.

In the studies performed, the amount of dispersion necessitated an N on the order of 5, but in principle, for severely bandwidth limited fibers, N could be larger. In the case where two Volterra Kernels are sufficient to create an accurate channel model, regardless of how large N is, the Volterra Kernel description is generally simpler.

Figure 6:
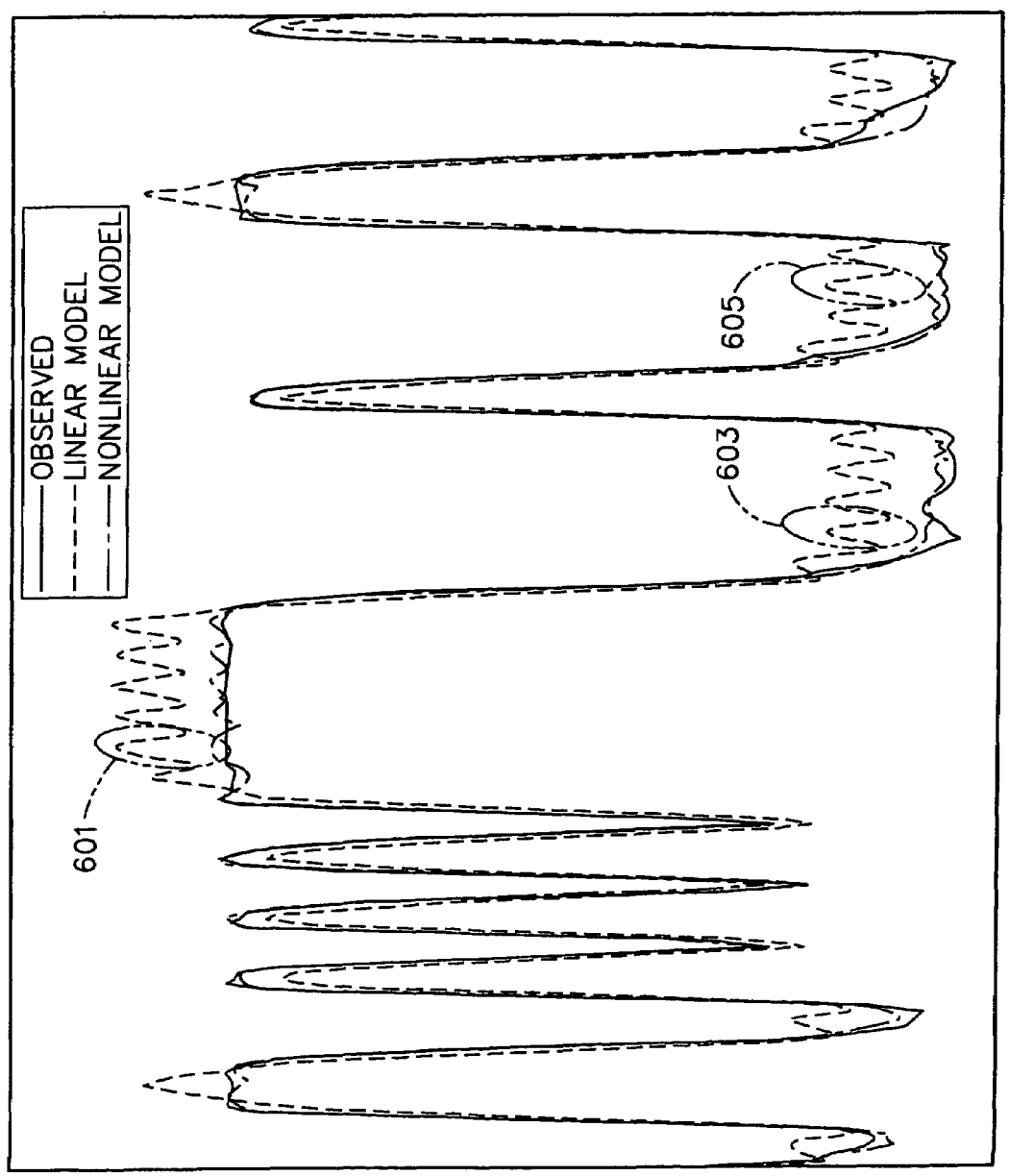
FIG. 6 is a graph illustrating measurement of a channel having an 850 nanometer VCSEL (Vertical Cavity Surface Emitting Laser) and fiber F0, and comparing the signal measurements to linear and nonlinear channel models.

FIG. 6 is a graph illustrating channel measurement, of a channel having an 850 nanometer VCSEL laser and fiber F0, and comparing the signal measurement with linear and nonlinear fiber models. In FIG. 6 the solid line corresponds to the observations, the dotted line represents the linear model, and the dashed and dotted represents the nonlinear model. As can be seen from 601, 603 and 605 the nonlinear model approximates the measurements of the channel to a greater degree than the linear model. Accordingly if the channel model were limited to a linear model a good fit for the transmitted data would not be achieved. In contrast using the nonlinear model a significantly closer fit may be obtained.

Figure 7:
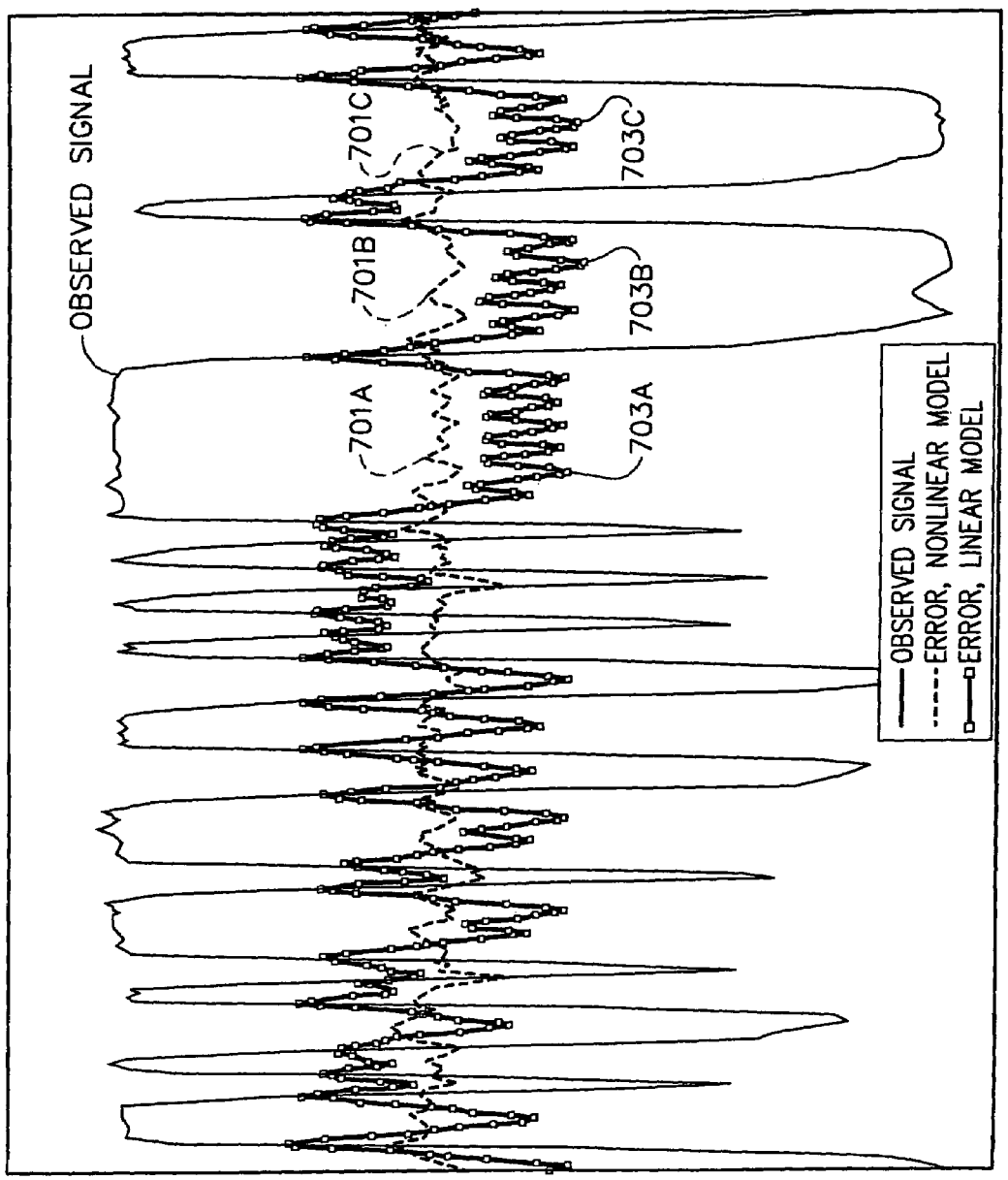
FIG. 7 is a graph illustrating the measurement of a channel having an 850 nanometer VCSEL and fiber F0, and comparing the amount of error generated by linear and nonlinear channel models.

FIG. 7 is a graph illustrating channel measurement of a channel having an 850 nanometer VCSEL laser and fiber F0, and comparing the signal measurement with amount of error generated by linear and nonlinear channel models. FIG. 7 is a graph representing the same time as the graph of FIG. 6 except that the errors instead of the signals themselves are shown. In FIG. 7 the linear model error is represented by the lines with circles and the nonlinear model is represented by the dotted line. As can be readily appreciated, by observing the nonlinear model points at 701 A, B, and C and comparing it with the linear model points at 703 A, B, and C the nonlinear model achieves a significantly smaller error.

Figure 8:
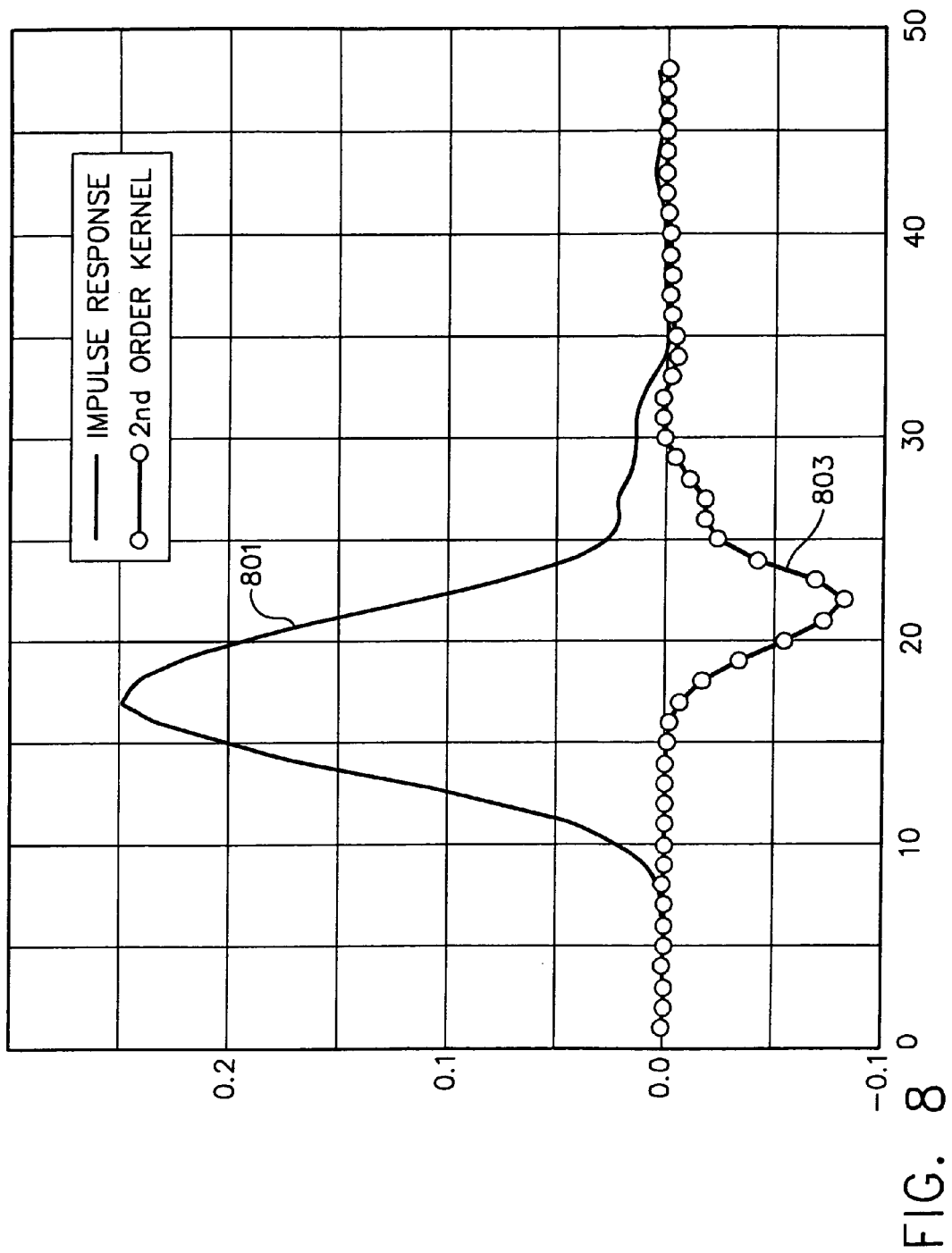
FIG. 8 is a graph representing an impulse response and a second order Volterra Kernel for an 850 nanometer VCSEL and fiber F0.

FIG. 8 is a graph representing the impulse response and a second order Volterra Kernel for a channel having an 850 nanometer wavelength VCSEL laser and utilizing fiber F0. FIG. 8 illustrates an impulse response (the linear term of the overall response) at 801. FIG. 8 also illustrates the response of the second order Volterra Kernel at 803. in the present embodiment, the second order Volterra Kernel, which is associated with products of two consecutive bits, is the only significant nonlinear kernel. So the response of the second order Volterra Kernel generated from the product $A_N \times A_{N-1}$ i.e. FIR 513 in FIG. 5. FIR 511 corresponds to the linear kernel response 801 and FIR 513 corresponds to the second order response 803. Using just the Volterra Kernels of FIR 511 and FIR 513 a close approximation of the channel which includes nonlinear elements and memory was achieved. The same method was used to examine the remaining fibers in the table of FIG. 3. The signal-to-noise ratio for the linear model and for the nonlinear model (which was a linear model with nonlinear addition) was computed for each fiber.

Signal-to-noise ratio is defined as 10 times the base 10 log of the signal power divided by the error power. To compute the signal-to-noise ratio the power for the signal was computed. The sum of the squares of the samples of the signal yields the total power of the signal and the sum of the squares of the samples of the error yields the error power.

There are two versions of the error power, one of them for the linear model containing one Volterra Kernel and the other for the nonlinear model containing the additional nonlinear Volterra Kernels. The result of the error computations for the linear and the nonlinear model is illustrated in the table of FIG. 9. As can be seen from the table of FIG. 9 the signal-to-noise ratio for the linear model is in the range of 12 to 13 dB. In the nonlinear model the error is significantly smaller, and correspondingly the signal to noise ratio is significantly higher in the range of 23 to 25 dB. The nonlinear model yields a model having approximately a 10 to 13 dB better signal to noise ratio, which is a significant improvement.

The previously described measurements were all done at 850 nanometers wavelength. In the measurements taken, the nonlinearity was much larger at 850 nanometers than at 1310 nanometers. If the same measurements are repeated at 1310 nanometers, the linear model appears to be very adequate.

Figure 10:
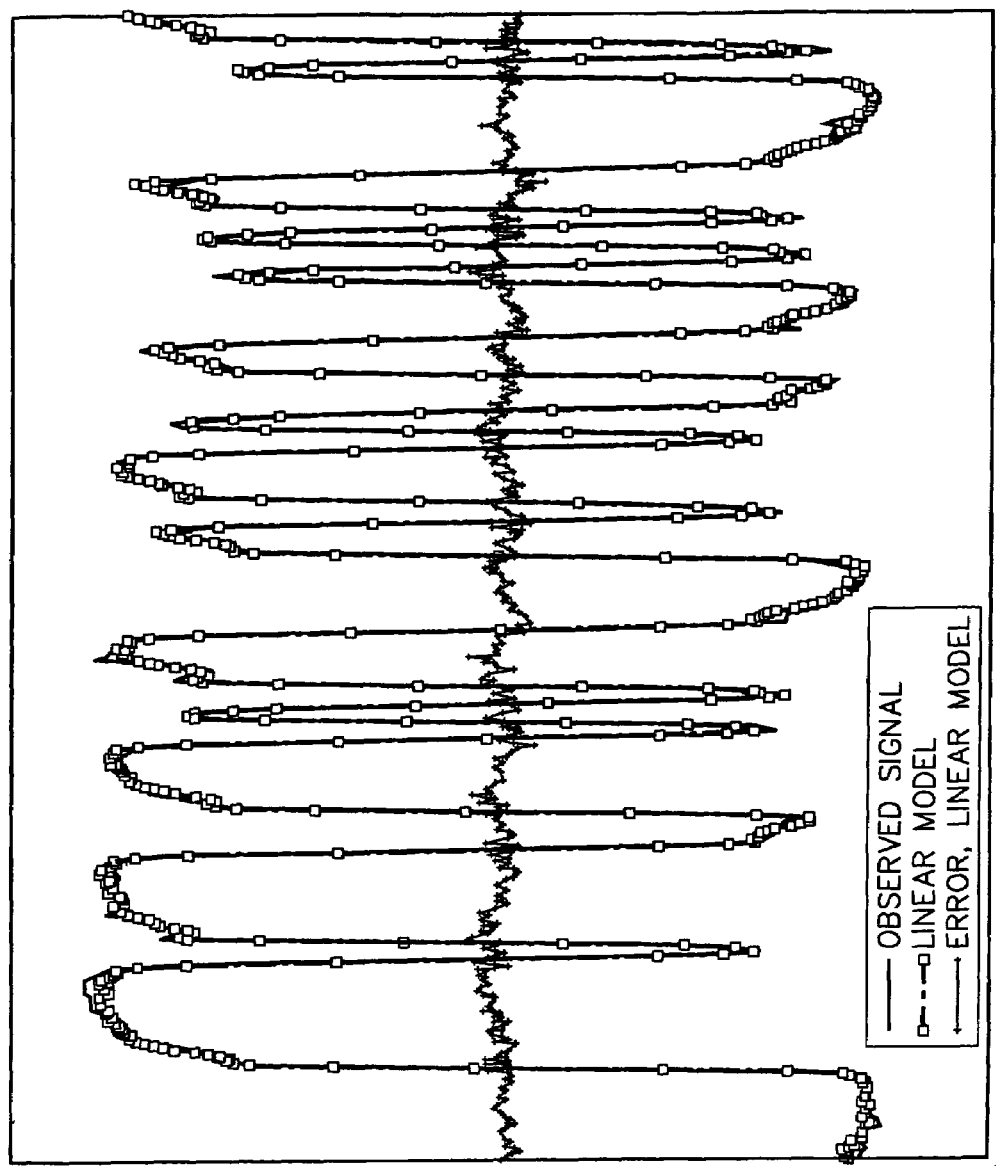
FIG. 10 is a graph comparing linear model, measured signal and error within a channel using a fiber F0 at a wavelength of 1310 nanometers.

FIG. 10 is a graph of measured signal vs. linear model and the error between the measured signal and the linear model. Accordingly with the present data rate and fibers the linear channel model at 1310 nanometers appears to be fairly accurate. The graph of FIG. 10 illustrates the measured signal as a solid line. The graph of FIG. 10 is the result of a linear model shown as the line with circles. The line with diamonds represents the error.

Figure 11:
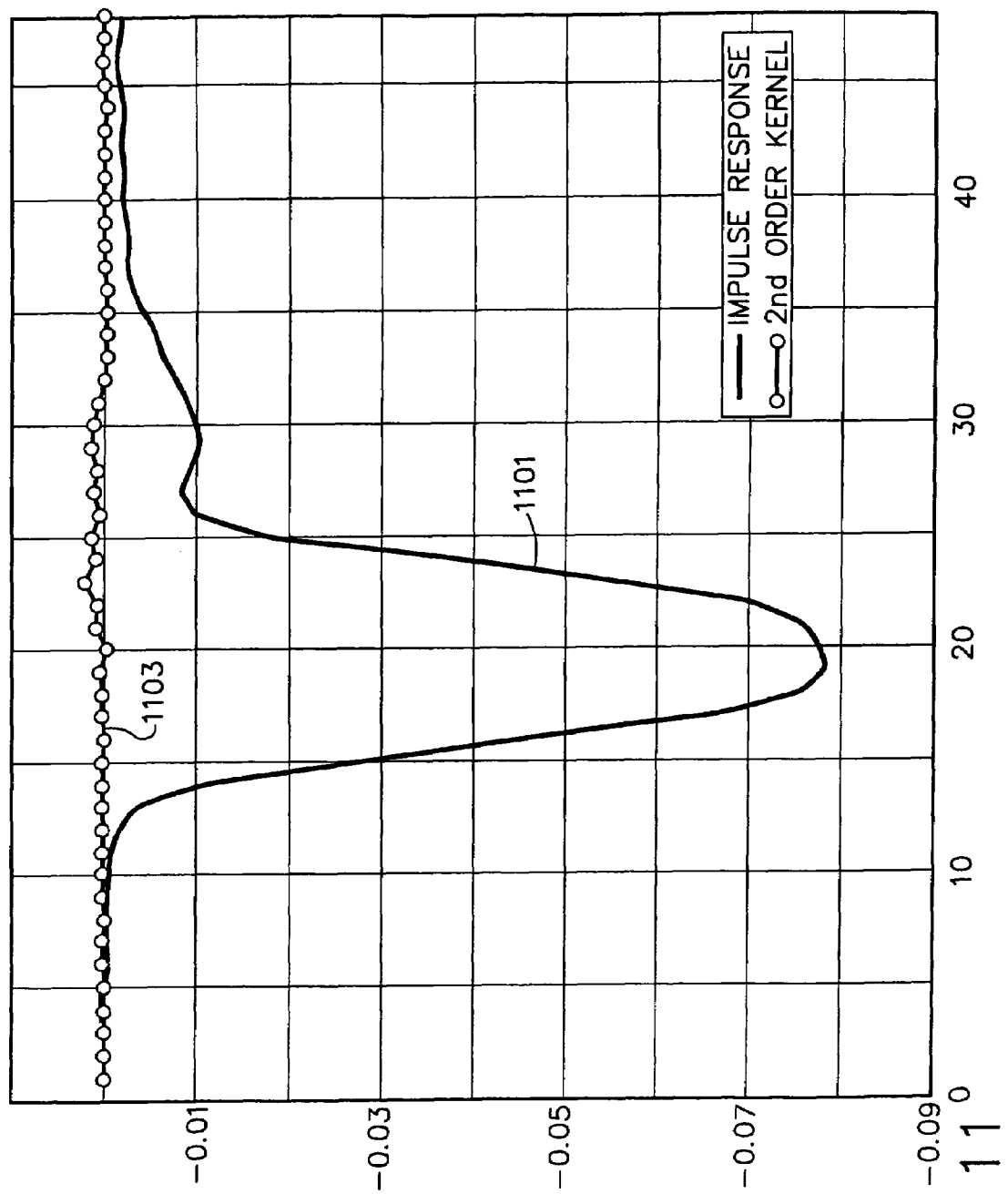
FIG. 11 is a graph of the impulse response and a second order Volterra Kernel for a channel using fiber F0 and a distributed feedback (DFB) laser with 1310 nanometer wavelength.

FIG. 11 is a graph of the impulse response and a second order Volterra Kernel for the channel comprising fiber F0 and a DFB laser having a 1310 nano-meter wavelength. The impulse response is illustrated at 1101 and the second order Volterra Kernel is illustrated at 1103. The second order Volterra Kernel is almost zero and most likely would not have to be taken into account in a model of the channel.

FIG. 12 is a table of signal-to-noise ratios for a linear channel model having a DFB laser operating at a wavelength of 1310 nanometers. All of the channel signal to noise ratios of all measured channels operating at a wavelength of 1310 nanometers were in the range of 26 to 28 dB indicating that a nonlinear term may not be necessary at a wavelength of 1310 nanometers, for a one gigahertz data rate.

Additionally measurements were done including cases where mechanical motion of a fiber was introduced during the measurement process to examine motion induced nonstationarity of the general response. These observations for nonstationarity were done because there is some belief that the optical channel is not fixed in time and if vibration is introduced in the fiber some redistribution of the modes in the fiber may change the response of the fiber and accordingly the channel may be time-dependent. No evidence of any significant change in the fiber response as a result of motion was observed.

Slow changes in the channel may be compensated by the LMS algorithm adjusting the channel model to track those types of changes.

A program listing of a computer program my be used for the channel studies. Essentially, such a program takes an input block of data from the measurements it processes, and then trains the canceller. It then computes the Volterra Kernels coefficients of the model using the linear model or the nonlinear model. The program computes a signal to noise ratio and it prints out the results.

Figure 13:
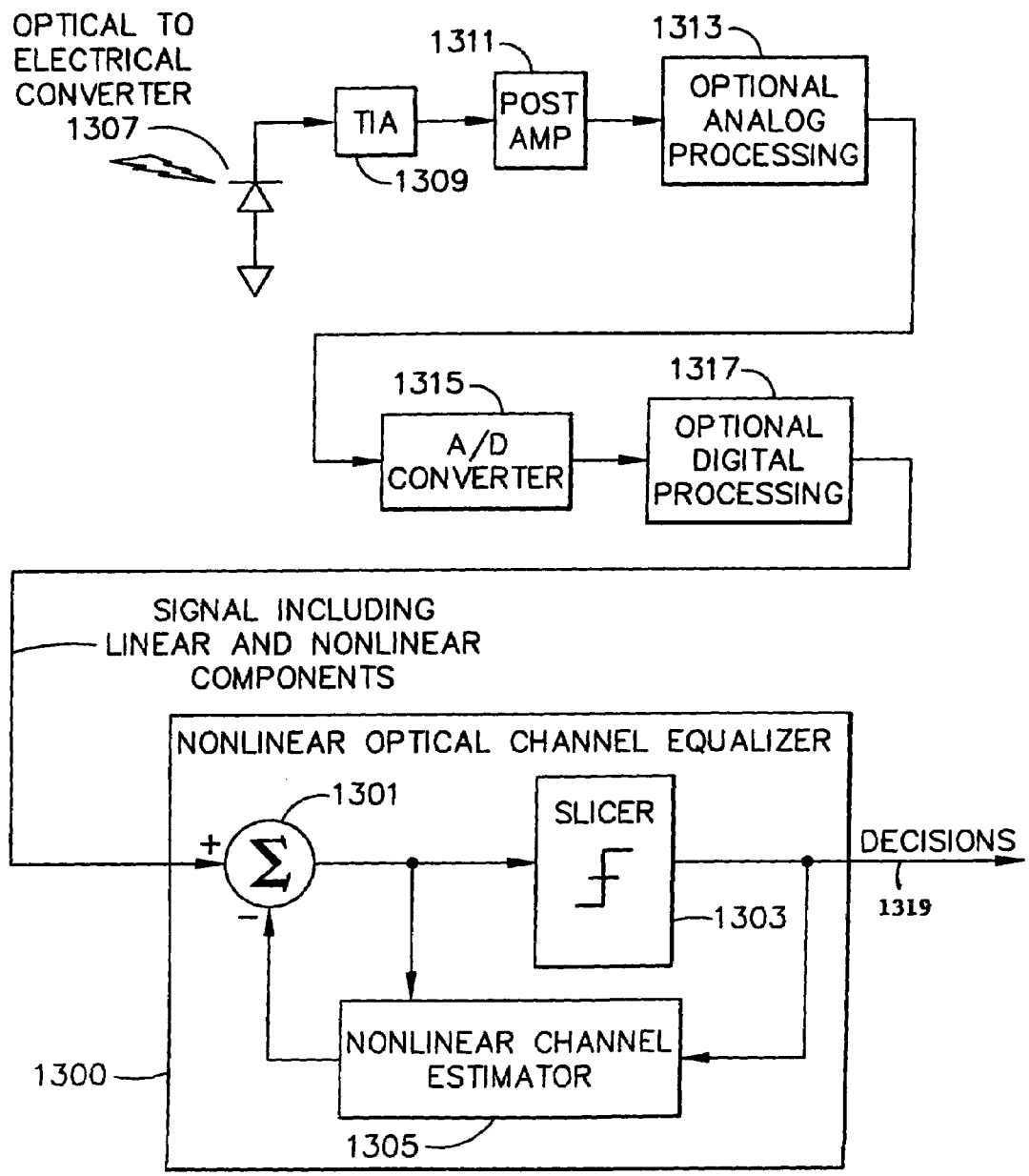
FIG. 13 is a block diagram of a nonlinear optical channel equalizer, according to an embodiment of the invention.

FIG. 13 is a block diagram of an optical receiver including a nonlinear optical channel equalizer. The nonlinear optical channel equalizer 1300 accepts a signal which includes linear and nonlinear components.

The electrical signal commonly results from converting an optical signal to the electrical domain using an optical to electrical converter 1307, such as for example a PIN diode, avalanche photodetector (APD), or another detector. The optical to electrical converter signal is amplified using a transimpedance amplifier (TIA) 1309 and a postamplifier 1311. The postamplifier 1311 generally should not hard-limit a signal provided to it as hard limiting may introduce nonlinearity.

After processing the signal provided to it the postamplifier 1311 may provide a processed signal to an optional analog processing block 1313. The analog processing block 1313 may provide such analog processing as filtering and automatic gain control, prior to providing an output signal to an analog to digital converter 1315. The output signal from the analog to digital converter converts the electrical signal provided by the optional analog processing block 1313 to a multibit digital representation, prior to providing the multibit digital representation to a nonlinear optical channel equalizer 1300. The nonlinear optical equalizer 1300 operates in the digital domain, and may be implemented using special-purpose digital logic or a general purpose programmable digital signal processor. Prior to entering the nonlinear optical equalizer 1300 the multibit signal may undergo additional preprocessing steps such as filtering, linear equalization, interference cancellation, etc. in an optional digital processing block 1317. Equalizer 1300 is a decision feedback equalizer comprising a detector such as slicer 1303, a compensator such as subtractor 1301 and a feedback block 1305. The feedback block 1305 includes a nonlinear channel estimator employing a lookup table as illustrated in FIG. 4 or the Volterra Kernel approach as illustrated in FIG. 5. A difficulty with using the look up table approach of FIG. 4 or the Volterra Kernel as illustrated in FIG. 5 is that in both cases the Volterra Kernel or look up table coefficients need to be identified. One solution to the problem of coefficient identification is to have the transmitter send a training sequence, which is known a priori, to the receiver. The nonlinear channel estimator 1305 can then be trained using the known training sequence. In such a case, the functioning of the nonlinear channel estimator 1305 would proceed as in FIG. 4 or FIG. 5 as the bit sequence would be known and differences produced by the channel could be readily identified.

In practice, a training sequence may not be required because the decisions 1319 of the decision feedback equalizer 1300 and the nonlinear channel estimator 1305 may still converge. Initially, because the channel estimator 1305 is not trained, the decisions 1319 will have multiple errors. There is however, in most channels, a bias towards good decisions. Most decision feedback equalizers will converge if the channels do not exhibit excessive intersymbol interference (ISI). Accordingly, if the coefficients in the nonlinear channel estimator 1305 are incorrect initially, there are both good and bad decisions. As long as the good decisions outnumber the bad decisions, there will be a converging trend and the nonlinear channel estimator 1305 will eventually tend to converge.

The nonlinear channel estimator 1305 may also be trained using an LMS algorithm as illustrated in FIG. 4 or 5. As the coefficients begin improving in the nonlinear channel estimator 1305, the improvement helps make a larger percentage of correct decisions, which further assists in the convergence of the nonlinear channel estimating filter 1305. Once the values in the estimating filter converge, the nonlinear channel estimator 1305 will have modified the coefficients so that essentially all correct decisions are made. Any incorrect decisions made by the system tend to corrupt the values in the nonlinear channel estimator 1305, however, as long as the correct decisions out number the incorrect decisions the nonlinear channel estimator will converge to an essentially correct solution. In other words, as long as the majority of decisions are correct the coefficients of the nonlinear channel estimator 1305 will have a net movement in the correct direction and converge.

Once there is an initial convergence in the nonlinear channel estimator 1305 the signal to the slicer 1303 is improved because at least some of the intersymbol interference is cancelled in summation unit 1301. As a result the number of correct decisions 1319 increases which leads to a better channel estimation. Past decisions are stored within the nonlinear channel estimator 1305 and are used to compute a replica of the intersymbol interference in order to provide it to summation unit 1301.

If a Volterra Kernel structure similar to FIG. 5 is used for the nonlinear channel estimator then the memory of past decisions are stored in the FIR filters 511 through 517, which each nominal contain a FIR delay line structure. If the look up table approach is used then the memory for the past decisions are stored within a shift register, such as that illustrated in 407 at FIG. 4.

Figure 14A:
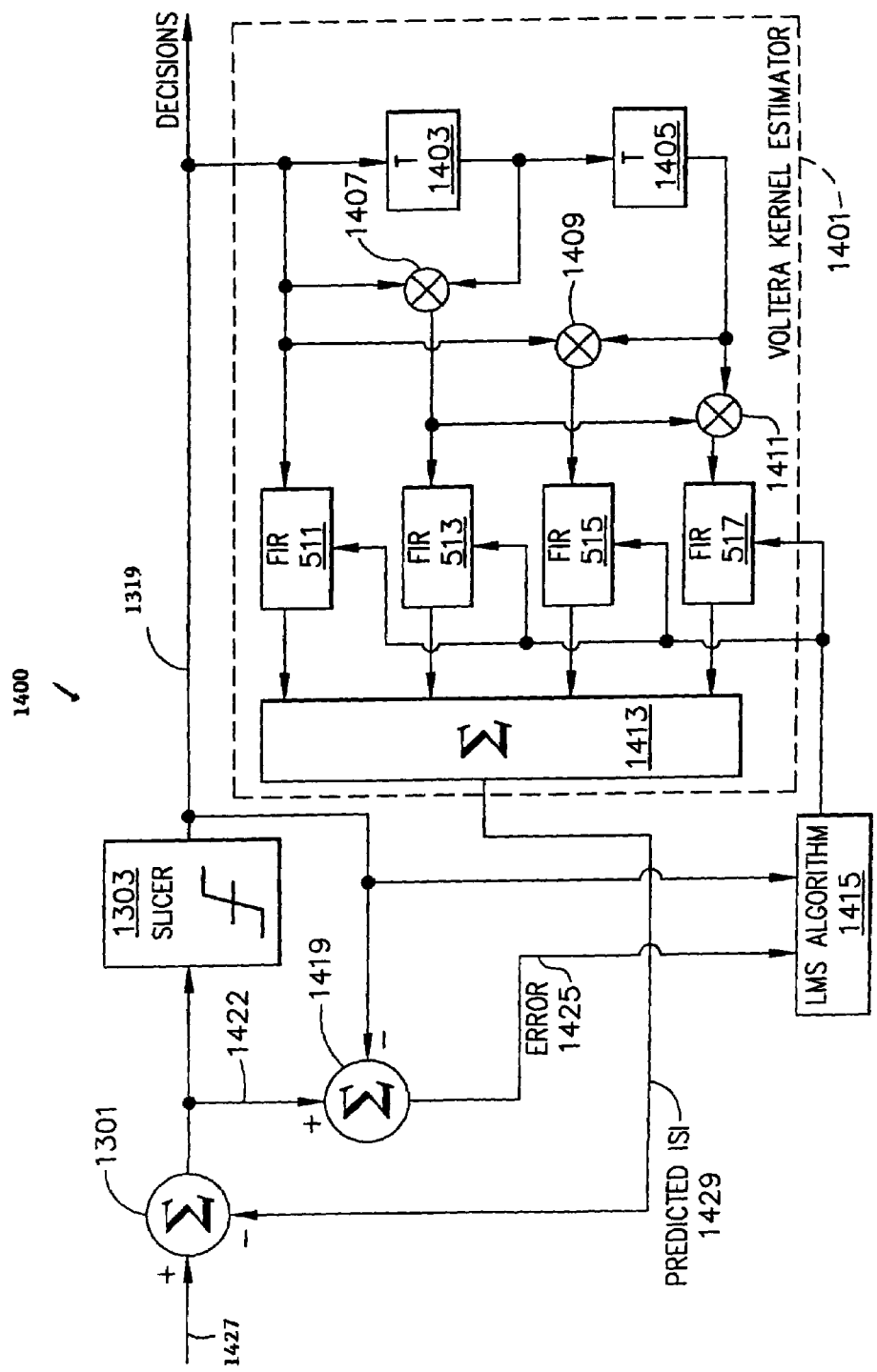
FIG. 14A is a block diagram of a nonlinear optical channel equalizer that employs a Volterra Kernel estimator according to an embodiment of the invention.

FIG. 14A is a block diagram of an exemplary nonlinear channel equalizer as may be used in the nonlinear decision feedback equalizer of FIG. 13. The nonlinear channel estimator of FIG. 14 is similar to the Volterra Kernel model illustrated in FIG. 5. The Volterra Kernel model of FIG. 5 was used as an illustration of characterization of the channel. The nonlinear channel estimator illustrated in FIG. 14 has an LMS update loop similar to FIG. 5. Additionally, similar to FIG. 5, the number of Volterra Kernels employed would depend upon the characteristics of the channel and the laser used to drive the channel.

In FIG. 14A, a signal 1427, which has been provided from an optical channel and converted to an electrical signal, is accepted by an optical channel equalizer, shown generally at 1400. The equalizer 1400 accepts the signal 1427 into a summation unit 1301 where a (negated) correction signal 1429, representing the predicted intersymbol interference, is added. Prior to the training and convergence of the Volterra Kernel estimator correction signal is zero or an arbitrary value. Slicer 1303 makes decisions 1319 as to the values of the signal transmitted. Decisions 1319 are accepted by Volterra Kernel estimator 1401, which models the nonlinearities of the channel that provides the signal to the equalizer 1400. The output of the Volterra Kernel estimator provides a value of predicted intersymbol interference 1429, which can then be subtracted from the accepted signal in order to accurately recreate a transmitted signal which has been transmitted.

The error in the predicted intersymbol interference 1429 is estimated by comparing decisions 1319 from slicer 1303 with the input signal 1422, which has been adjusted in summation unit 1301 by removing the predicted intersymbol interference ISI 1429. The decisions 1319 and error 1425 are used to adjust the FIR filters 511, 513, 515, and 517, which exemplarily illustrate the FIR filters which comprise the Volterra Kernel estimator 1401. In such a manner, the Volterra Kernel estimator may be trained and compensate for non-linearities within the channel that provides the signal to the equalizer 1400.

Figure 14B:
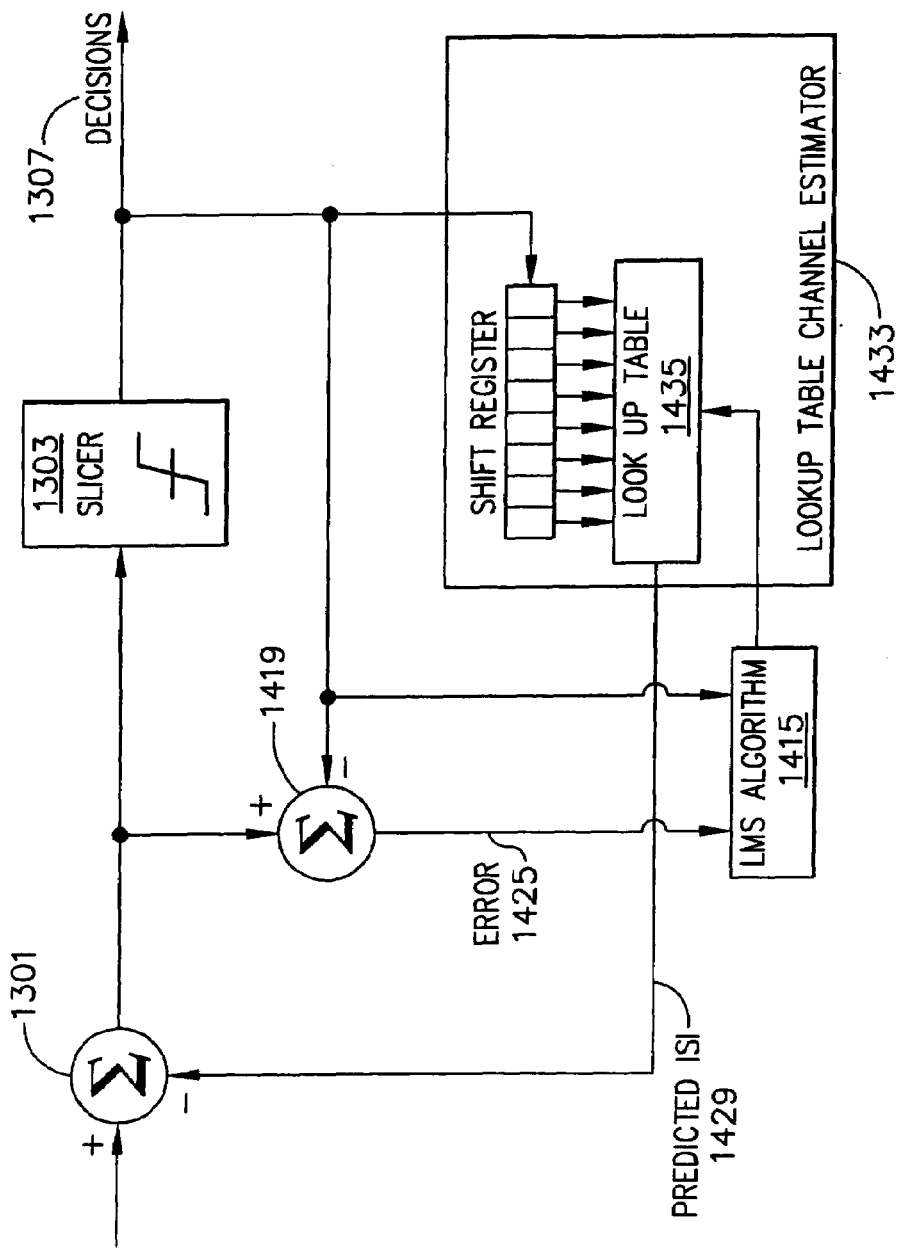
FIG. 14B is a block diagram of a non-linear optical channel equalizer employing a lookup table channel estimator, according to an embodiment of the invention.

FIG. 14B is an exemplary block diagram of a non-linear optical channel equalizer employing a lookup table channel estimator, according to the embodiment of the invention. In FIG. 14B an LMS algorithm may be employed in adjusting the values within the look up table 1435. The system 14B may be operated so that training of the equalizer is accomplished by processing of a signal provided from an optical channel, determining error signals and adjusting the equalizer 1401. In such a manner the equalizer may be trained to model the channel parameters. Those skilled in the art will recognize that the equalizers may be trained by employing a known sequence. Because such a sequence is known a priori the difference between the response of the channel and the desired response of the channel, i.e., the known sequence, can be readily determined. Such sequences may shorten the time necessary to train a nonlinear optical channel equalizer.

A nonlinear channel estimator could also be built based on the look up table approach illustrated in FIG. 4. The implementation of such a look up table version is a straightforward adaptation of the channel characterization circuit illustrated in FIG. 4.

Figure 15:
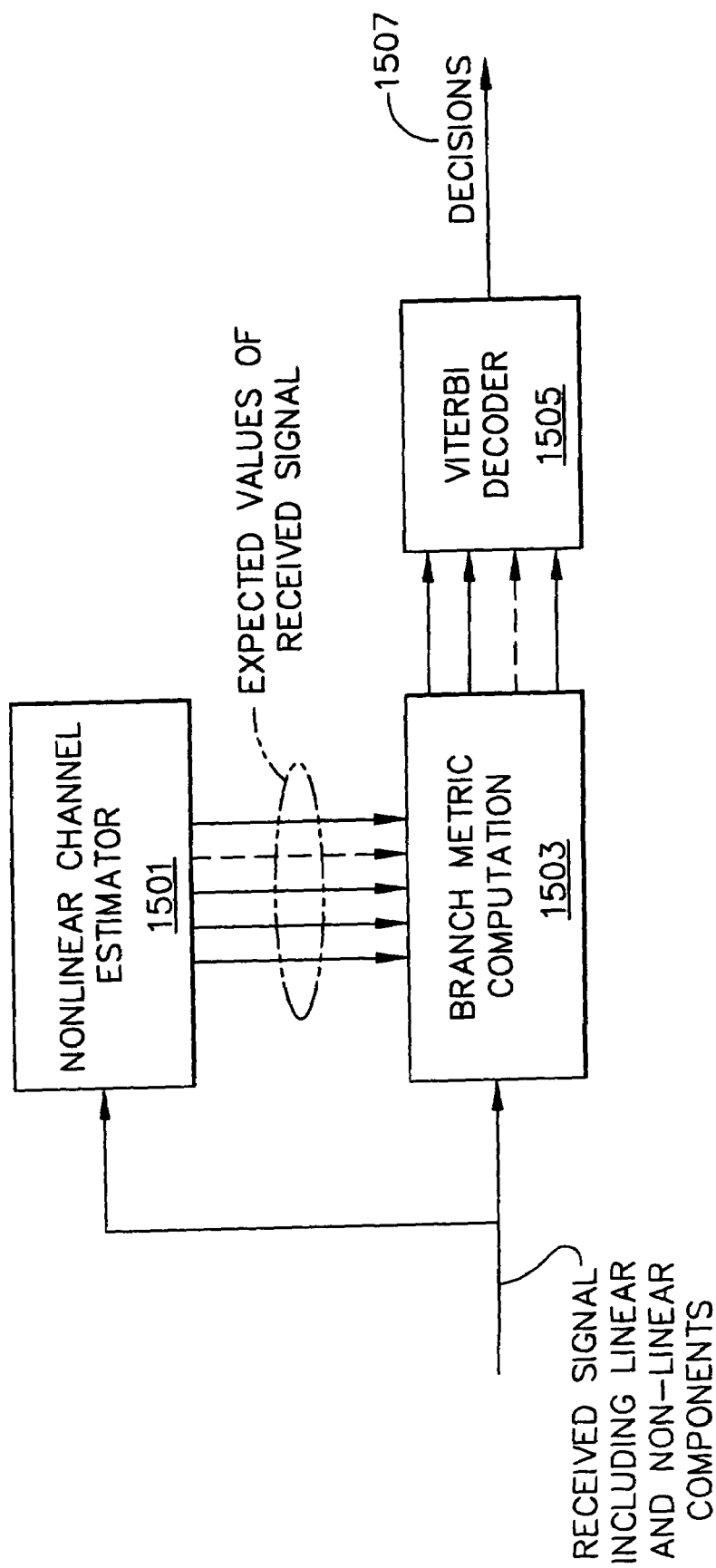
FIG. 15 is a Viterbi decoder employing a nonlinear channel estimator, according to an embodiment of the invention.

FIG. 15 is a block diagram of a nonlinear channel estimator combined with a Viterbi decoder. Instead of a decision feedback equalizer a Viterbi decoder may be used. Nonlinear channel estimator 1501 would be used to compute the expected signal going to the branch metric computations 1503. The remainder of the Viterbi decoder system including the actual Viterbi decoder itself, block 1505, is similar to the linear case. The nonlinear channel estimator 1501 is creating a model of the received signal. If the nonlinear channel estimator 1501 has a memory comprising k bits, that is it remembers the last k inputs, then the Viterbi decoder 1505 would have $2^{(k-1)}$ states. Therefore, if k=3 then the Viterbi decoder 1505 would be a 4 state Viterbi decoder. If the nonlinear channel estimator 1501 has a memory of 3 bits then it can support eight different expected values of the received signal. Which would be implemented with a look up table have eight locations. The expected values of the received signal are used by the branch metric computations 1503 to compute all the branch metrics in the Viterbi decoder.

The Viterbi decoder illustrated in FIG. 15 is the same as a standard type Viterbi decoder except for the fact that the channel estimator function is a nonlinear channel estimator with memory. The nonlinearity is expressed either in the form of a look up table or a Volterra Kernel.

The Viterbi decoder includes a receiver for receiving a signal including linear and non linear components. A non linear channel estimator computes the expected values of the received signal. A branch metrics computer computes the branch metrics based on the expected values of the received signal. A standard Viterbi decoder accepts the computed branch metrics and decodes the received signal. The non linear channel estimator can be fabricated using a Volterra kernel estimator as illustrated at 1401 in FIG. 14A or a look up table estimator as illustrated at 1433 in FIG. 14B.

What is claimed is:

1. A method for enhancing the behavior of an optical fiber data channel the method comprising:
   determining a sequence of data input to the optical fiber data channel;
   using at least part of the sequence of data input to the data channel as an index to a channel model value;
   sampling the data after it has passed through the channel to produce a sampled value;
   comparing the channel model value with the sampled value;
   adjusting the channel model value based on the results of the comparison between the channel model value and the sampled value;
   identifying non-linearities in the optical fiber data channel based on the adjusted channel model; and
   compensating for the non-linearities to enhance channel performance.

2. A method as in claim 1 wherein determining a sequence of data input to the data channel comprises determining the last N bits input to the channel.

3. A method as in claim 2, where N=5.

4. A method as in claim 1 wherein the sampling of the data after it has passed through the channel to produce a sampled value comprises producing a real number representing the sampled value.

5. A method as in claim 1, wherein adjusting the channel model value further comprises adjusting the channel model value according to an LMS (Least Means Squared) algorithm.

6. A method as in claim 1 wherein adjusting the channel model value further comprises adjusting the channel model value until it converges.

7. A method as in claim 6 further comprising converting a look up table into Volterra Kernels.

8. A method as in claim 7 further comprising converting the look up table into Volterra Kernels using a Hadamard transform.

9. A method as in claim 7 further comprising adjusting the Volterra Kernels based on the results of the comparison between the channel model value and the sampled value.

10. A method as in claim 9 further comprising eliminating insignificant Volterra Kernels.

11. A method as in claim 1 comprising configuring the channel model in accordance with a training sequence.

12. A method for enhancing the behavior of an optical fiber data channel the method comprising:
    determining a sequence of data input to the optical fiber data channel;
    determining a Volterra Series representation of the channel;
    accepting at least part of the sequence of data input to the data channel into the Volterra series representation of the channel to produce a channel model value;
    sampling the data after it has passed through the channel to produce a sampled value;
    comparing the channel model value with the sampled value;
    adjusting the channel model value based on the results of the comparison between the channel model value with the sampled value;
    identifying non-linearities in the optical fiber data channel based on the adjusted channel model; and
    compensating for the non-linearities to enhance channel performance.

13. A method as in claim 12 wherein determining a Volterra Series representation of the channel comprises:
    accepting a most recent value of the sequence of data input to the data channel; accepting the most recent value of the sequence of data input to the data channel into a first FIR (Finite Impulse Response) filter;
    accepting a product of the most recent value of the sequence of data input to the data channel and a second most recent value of the sequence of data input to the data channel into a second FIR; and summing an output of the first FIR and output of the second FIR to form the channel model value.

14. A method as in claim 12 wherein determining a Volterra Series representation of the channel comprises:
accepting a most recent value of the sequence of data input to the data channel accepting the most recent value of the sequence of data input to the data channel into a first FIR filter;
accepting a product of the most recent value of the sequence of data input to the data channel and the second most recent value of the sequence of data input to the data channel into a second FIR;
accepting a product of the most recent value of the sequence of data input to the data channel and a third most recent value of the sequence of data input to the data channel into a third FIR; and
summing an output of the first FIR and output of the second FIR and output of the third FIR to form the channel model value.

15. A method as in claim 12 wherein determining a Volterra Series representation of the channel comprises:
accepting a most recent value of the sequence of data input to the data channel; accepting the most recent value of the sequence of data input to the data channel into a first FIR filter;
accepting a product of the most recent value of the sequence of data input to the data channel and the second most recent value of the sequence of data input to the data channel into a second FIR;
accepting a product of the most recent value of the sequence of data input to the data channel and a third most recent value of the sequence of data input to the data channel into a third FIR;
accepting a product, said product being the most recent value of the sequence of data;
input to the data channel and the two next most recent data input, into a fourth FIR; and summing an output of the first FIR and output of the second FIR and output of the third;
FIR and output of the fourth FIR to form the channel model value.

16. A method as in claim 13 wherein the difference between the channel model value and the output of the channel is used to update all the FIRs.

17. A method as in claim 14 wherein the difference between the channel model value and the output of the channel is used to update all the FIRs.

18. A method as in claim 15 wherein the difference between the channel model value and the output of the channel is used to update all the FIRS.

19. A method as in 16 wherein an LMS algorithm is used to update all the FIRS.

20. A method as in 17 wherein an LMS algorithm is used to update all the FIRS.

21. A method as in 18 wherein an LMS algorithm is used to update all the FIRs.

22. A method for equalizing an optical signal, modulated with a digital signal, received over an optical channel, the method comprising: converting the optical signal into an electrical signal;
summing the electrical signal with a correction signal;
providing the summed signal to a detector;
detecting the summed signal to produce decisions;
providing the decisions to a nonlinear channel estimator;
estimating the correction signal in the nonlinear channel estimator; and
adapting the estimating in the nonlinear channel estimator in accordance with the decisions.

23. The method of claim 22 wherein estimating the correction signal in the nonlinear estimator further comprises:
accepting the decisions;
predicting the inter-symbol interference of the channel in a nonlinear channel estimator; and
forming a correction signal from the predicted inter-symbol interference.

24. The method of claim 23 wherein predicting the inter-symbol interference of the channel further comprises:
providing the decisions to a plurality of Volterra Kernels; and
summing the output of the plurality of Volterra Kernels to form a correction signal.

25. The method of claim 24 further comprising:
comparing the predicted inter-symbol interference to inter-symbol interference in the electrical signal; and
updating the Volterra Kernels based on the result.

26. The method as in claim 25 wherein updating the Volterra Kernels comprises using a LMS (Least Means Squared) algorithm to update the Volterra Kernels.

27. The method of claim 23 wherein predicting the inter-symbol interference of the optical channel further comprises:
providing the data decisions as an address into a look up table;
outputting a value stored in the look up table as the predicted inter-symbol interference; comparing the predicted inter-symbol interference to the inter-symbol interference in the electrical signal; and
updating the value stored in the look up table based on the result.

28. The method as in claim 27 wherein updating the value stored in the look up table comprises using a LMS (Least Means Squared) algorithm.

29. An apparatus for equalizing a signal received over an optical channel, the apparatus comprising:
an input that accepts an optical signal;
a converter that converts the optical signal into an electrical signal;
a summation unit that sums the electrical signal with a correction signal;
a detector that detects the summed signal to produce decisions; and
a nonlinear channel estimator that estimates the correction signal and adapts the estimating in accordance with the decisions.

30. The apparatus of claim 29 wherein the nonlinear estimator further comprises:
an input that accepts the decisions;
an estimating circuit that predicts the inter-symbol interference of the channel; and
an output that provides a correction signal from the estimated inter-symbol interference.

31. The apparatus of claim 30 wherein estimating circuit that estimates the intersymbol interference of the channel further comprises:
a plurality of Volterra kernels that accept the decisions and produce individual outputs; and
a summation unit that sums the individual outputs of the plurality of Volterra Kernels to form a correction signal.

32. The apparatus of claim 31 further comprising:
a comparator for comparing the predicted inter-symbol interference to the inter-symbol interference in the electrical signal; and means for updating the Volterra kernels based on the result.

33. The apparatus as in claim 32 wherein the comparator that compares the predicted inter-symbol interference to the inter-symbol interference in the electrical
signal includes a LMS (Least Means Squared) algorithm that compares the predicted inter-symbol interference to the inter-symbol interference in the electrical signal.

34. The apparatus of claim 30 wherein the estimating circuit that estimates the intersymbol interference further comprises:
a look up table which accepts the data decisions as an address into the look up table; values of the predicted inter-symbol interference stored in the look up table;
a subtractor that subtracts the predicted inter-symbol interference from the electrical
signal to produce a signal substantially free from intersymbol interference;
a second subtractor that subtracts the decision from the substantially inter-symbol interference free signal to produce an error; and
means for updating at least one of the values stored in the look up table based on the error.

35. The apparatus as in claim 34 wherein comparing the comparator that compares the estimated inter-symbol interference to the inter-symbol interference in the electrical signal comprises a LMS (Least Means Squared) algorithm that compares the predicted inter-symbol interference to the inter-symbol interference in the electrical signal.

36. A method for decoding a signal received over an optical channel, the method comprising:
receiving a signal including linear and nonlinear components;
estimating, in a nonlinear channel estimator having a memory width, expected values of the received signal;
computing branch metrics over a number of states based on the expected values of the received signal, wherein the number of states corresponds to the memory width;
providing the computed branch metrics to a Viterbi decoder; and
Viterbi decoding the received signal using the branch metrics provided to the Viterbi decoder.

37. The method of claim 36 wherein estimating, in a nonlinear channel estimator, the expected values of the received signal comprises:
providing a value of the received signal to a Volterra kernel estimator; and
computing the expected value sent based on the output of the Volterra kernel estimator.

38. The method of claim 36 wherein estimating, in a nonlinear channel estimator, the expected values of the received signal comprises: providing the value of the received signal as an address to a look up table; and looking up a stored value as an actual value transmitted.

39. An apparatus for decoding a signal received over an optical channel, the apparatus comprising:
a receiver for receiving a signal including linear and nonlinear components;
a nonlinear channel estimator, having a memory width, that computes expected values of the received signal;
a branch metrics computer for computing branch metrics over a number of states based on the expected values of the received signal, wherein the number of states corresponds to the memory width;
a Viterbi decoder that accepts the computed branch metrics and Viterbi decodes the received signal.

40. The apparatus of claim 39 wherein the nonlinear channel estimator that computes the expected values of the received signal comprises a Volterra kernel estimator that computes the expected values sent based on an output of the Volterra kernel estimator.

41. The apparatus of claim 39 wherein the nonlinear channel estimator that computes the expected values of the received signal comprises a look up table that uses a value of the received signal as an address to look up a stored value as an actual value transmitted.

42. A method for detecting digital data modulated on an optical signal and received over an optical channel, the method comprising:
converting the optical signal to an electrical signal;
converting the electrical signal to a multibit digital representation; estimating distortion introduced in the optical signal by the optical channel; compensating the multibit digital representation for the distortion; and detecting the digital data from the compensated multibit digital representation.

43. A method as in claim 42 wherein estimating distortion introduced in the optical signal by the optical channel comprises estimating in a Volterra Kernel estimator the distortion introduced in the optical channel.

44. A method as in claim 42 wherein estimating distortion introduced in the optical signal by the optical channel comprises estimating in a lookup table estimator the distortion introduced in the optical channel.

45. An apparatus for detecting digital data modulated on an optical signal and received over an optical channel, the apparatus comprising:
a converter for converting the optical signal to an electrical signal;
an analog to digital converter that converts the electrical signal to a multibit digital representation;
an estimator that estimates distortion introduced in the optical signal by the optical channel;
a compensator that compensates the multibit digital representation for the distortion; and a detector that detects the digital data from the compensated multibit digital representation.

46. An apparatus as in claim 45 wherein the estimator that estimates distortion introduced in the optical signal comprises a Volterra Kernel estimator.

47. An apparatus as in claim 45 wherein the estimator that estimates distortion introduced in the optical signal comprises a lookup table estimator.

* * * * *